March 3, 1970     D. R. OLDHAM     3,497,894
VEHICLE CLEANING BRUSH DRIVE SYSTEM
Filed Feb. 20, 1968     6 Sheets-Sheet 1

INVENTOR
DALE R. OLDHAM

March 3, 1970 D. R. OLDHAM 3,497,894
VEHICLE CLEANING BRUSH DRIVE SYSTEM
Filed Feb. 20, 1968 6 Sheets-Sheet 3

INVENTOR
DALE R. OLDHAM

March 3, 1970   D. R. OLDHAM   3,497,894
VEHICLE CLEANING BRUSH DRIVE SYSTEM
Filed Feb. 20, 1968   6 Sheets-Sheet 5

INVENTOR.
DALE R. OLDHAM
BY
Woodard, Weikart, Emhardt & Naughton
ATTORNEYS

United States Patent Office 3,497,894
Patented Mar. 3, 1970

3,497,894
VEHICLE CLEANING BRUSH DRIVE SYSTEM
Dale R. Oldham, Phoenix, Ariz., assignor to
Earl Dallas Smith, Phoenix, Ariz.
Continuation-in-part of application Ser. No. 663,874,
Aug. 28, 1967. This application Feb. 20, 1968, Ser. No.
706,828
Int. Cl. B60s 3/00
U.S. Cl. 15—21                                         8 Claims

ABSTRACT OF THE DISCLOSURE

A hydraulic motor driven vehicle body cleaning brush normally disposed in the path of the vehicle and movable thereby in a horizontal arc about a vertical pivot to follow the contour of the vehicle as it is moved along the ground. An actuator responsive to pressures in the motor supply line at a certain brush load level to trigger a series of valve events reversing the hydraulic motor and thereby reversing the direction of brush rotation. A timing device operative following initiation of the valve events to enable return of the flow direction valve to initial condition, again reversing the hydraulic motor to return the brush rotation to its initial direction. An alternate construction employs a jointed arm assembly of configuration alterable by brush loading beyond a certain level to trigger the brush reversal.

CROSS-REFERENCE TO RELATED APPLICATION

This application is a continuation-in-part of my copending application Ser. No. 663,874, filed Aug. 28, 1967 and now Patent No. 3,448,473 and entitled Vehicle Cleaning Brush Drive System.

BACKGROUND OF THE INVENTION

Field of the invention

This invention relates generally to vehicle cleaning brush drive systems and more particularly to a system operative to reverse brush rotation upon sensing a load above a predetermined level.

Description of the prior art

In the car washing business, there is a trend toward automatic car washing equipment minimizing labor requirements. Some equipment has been devised which employs large brushes rotating on vertical axes supported on arms which are also pivoted on vertical axes so that a car being moved along the conveyor will meet such a brush at approximately the center line of the car, and will proceed to push the brush out of the way of the car as the car moves along. In some installations, these brushes thereby brush at least a portion of the front end of the car and continue brushing along the side of the car as the car moves along.

With the advent in very recent years of greater varieties of front-end shapes on cars, the matter of thoroughly brushing the entire front end is beset with problems sometimes resulting in damage to the cars or brushing units or both. Some efforts to solve these problems have included the selection of brush rotational direction and mounting such as to use the brush action itself in an effort to keep the brush from becoming lodged or overloaded in any crevice or depression in the car surfaces being brushed and tending to throw the brush away from the car under such circumstances. However this approach often results in irregular brush effort on the surfaces being brushed, intermittent contact, and occasional violent reactions on certain parts of the brushing equipment. In addition to the inadequate brushing job which results from such arrangements, there is a psychological disadvantage to such equipment because of the violent and erratic motions characteristic thereof. In contrast, the present invention provides a virtually continuous and uniform brushing effort which is both psychologically attractive and functionally effective.

SUMMARY

Described briefly, in a typical embodiment of the present invention, a vehicle cleaning brush is disposed in the path of the vehicle and is normally rotated in one direction by a hydraulic motor. Pressure sensing means are provided in the hydraulic supply to the motor so that, as pressure rise in the supply line occurs as a result of the vehicle moving the brush to a position where the load on the brush increases, the sensing means provide a sequence of valve events to reverse the hydraulic motor and thereby reverse the direction of brush rotation. Adjustable time delay means are provided in the valving system so that, at an adjustable delay after reversal of the motor, it is again automatically reversed so that the initial direction of rotation is reinstated, whereby virtually continuous and effective working contact of the brush is maintained with the vehicle body as the vehicle moves along and the brush follows the surface contour.

BRIEF DESCRIPTION OF THE DRAWING

The full nature of the invention will be understood from the accompanying drawings and the following description and claims.

DESCRIPTION OF THE PREFERRED EMBODIMENTS

Figure 1:
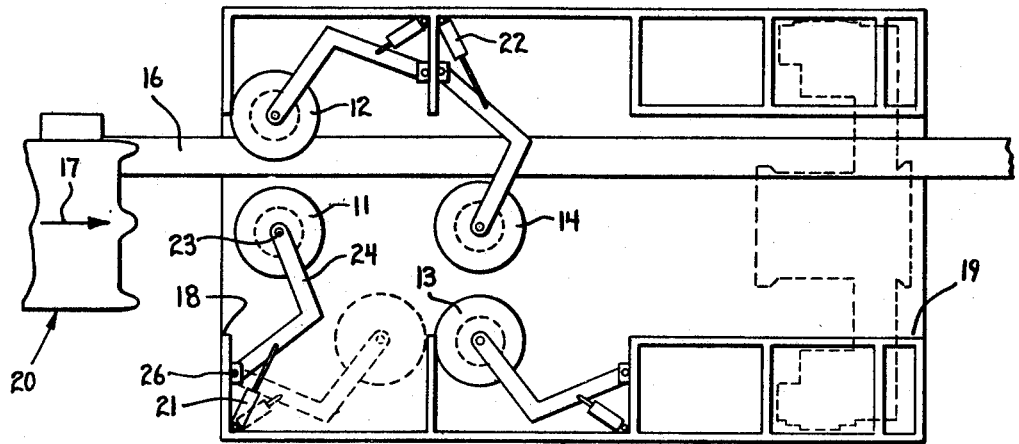
FIG. 1 is a schematic top plan view of an automatic car wash apparatus illustrating in the solid outlines the usual brush location as a vehicle approaches on the conveyor for washing.
Figure 2:
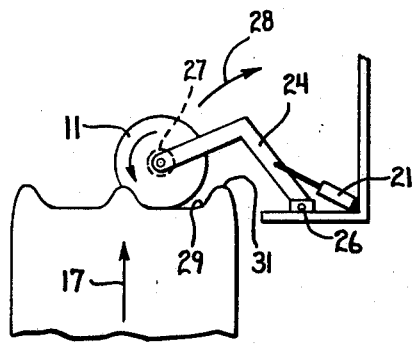
FIG. 2 is an enlarged fragmentary top plan view showing the first brush a few moments after it has been contacted and moved a bit by the front end of the advancing vehicle.
Figure 3:
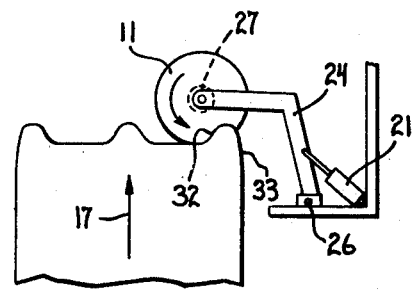
FIG. 3 is like FIG. 2 at a further stage of advance of the vehicle.

Referring now to FIGURE 1, a building 10 is provided with a set of vehicle body washing brushes 11, 12, 13, and 14 therein, and a conveyor 16 on the floor thereof for moving vehicle 20 in the direction of the arrow 17 through the entrance 18, through the building 10 and out through the exit 19. For purposes of example, each of the brushes is shown mounted for rotation on a vertical axis at the outer end of an L-shaped frame or arm, with a pneumatic actuator mounted to the building and connected to the arm for positioning of the brush. For example, brush 11 is normally disposed near the center of the path of the vehicle 20 and maintained in that position by pressure on a pneumatic actuator 21. The brush 11 is intended to wash the front end of the vehicle beginning at a point to the left of center and continuing around the front end and then the right-hand side of the vehicle. Similarly, the brush 14 normally disposed in the center of the path of the vehicle by the pneumatic actuator 22 is intended to wash the front of the vehicle from a point to the right of center and continue across toward the left side and along the left-hand side of the vehicle as it moves through the building. The other brushes 12 and 13 are intended to wash the sides of the vehicle and the rear end thereof. All brushes are typically provided with long flexible plastic bristles which are normally so flexible that when the brushes are not rotating, they hang vertically and occupy less space than when the brushes are rotating, as indicated by the dotted circles for the stationary condition of the brushes as distinguished from the solid outlines for the bristle tips as the brushes are rotating.

In the normal sequence of events as the vehicle moves through the building, the vehicle pushes the brush 11 outward toward the position shown by the dotted outlines and, as the left front end of the vehicle has passed brush 12, the actuator for that brush advances it against the side of the vehicle. When the front end reaches brush 14, it pushes it out to the left toward a retracted position similar to that for brush 11 and after the front end has passed brush 13, its actuator moves it into engagement with the side of the vehicle. When the left rear end of the vehicle has come adjacent the brush 12, the brush begins to move across toward the center to brush the left rear end portion. Then its actuator reverses and returns it to the retracted position, while the actuator 21 for brush 11 moves it to the extended position shown in FIGURE 1. When the right rear end of the vehicle reaches brush 13, the brush begins to move across the rear end and cleans it, subsequent to which its actuator returns it to the retracted position and brush 14 is again extended to the center of the path by its actuator 22. This sequence of events, and control means by which it can be achieved, are described in a Patent No. 3,332,098 of Earl Dallas Smith, issued July 25, 1967.

To describe the present invention, reference is made to brush 11 mounted for rotation on a vertical axis 23 at the distal or free end of the generally L-shaped arm 24 pivotally mounted on a vertical axis to the building 10 at 26. Pneumatic ram 21 continuously urges the brush toward the center of the path of the car. The brush is normally driven in a counterclockwise direction of rotation about the axis 23 by a hydraulic motor 27 mounted to the brush arm and inside of the brush hub. As the car is advanced in the direction of the arrow 17 by the conveyor 16, it swings the brush unit in the direction of the arrow 28 from the extended position in the path of the car toward the retracted position shown by the dotted outline in FIGURE 1. Accordingly the brush moves along toward the crevise or concavity 29 in the front end of the car between the usual front end grill location and the front marginal edge 31 of the bumper and fender assembly. When this occurs, continued advance of the car makes it more difficult for the brush to continue rotating in the counter-clockwise direction, because the direction of motion of the bristles at the point of contact with the car is toward the outside of the path of the car, tending to drive the brush toward the center of the path, and toward the center of the car. Yet the brush cannot move in that direction because of the pivotal connection of the arm at 26 and the rigid nature of the frame so, as the car continues to move forward the resistance to counter-clockwise brush rotation continues to increase, particularly when the bristles engage the faces 32 of the front fender which face toward the center of the path of the car.

According to illustrated embodiments of the present invention, the hydraulic motor is reversed when the advance of the car causes the load to increase to a certain level. Immediately clockwise rotation of the brush begins so that the bristles are moving toward the center of the car at the point of contact therewith, tending to move the brush toward the front end margin 31 of the fender and then around the front end into contact with the side of the fender at 33. Continued clockwise rotation of the brush would tend to move the brush toward the rear of the car, the bristles moving toward the front at the point of contact thereof with the car.

Figure 4:
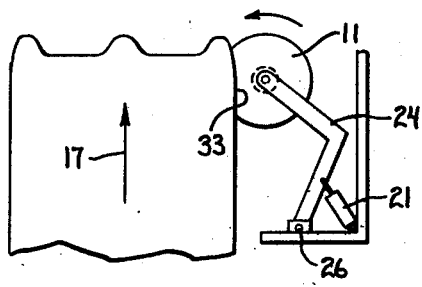
FIG. 4 is a view like FIG. 2 at a still further stage of advance of the vehicle.

Because the clockwise rotation of the brush tends to aid the outward swinging of the brush in the direction of the arrow 28 toward retracted position, the torque load is substantially less than it would have been if the brush were forced around the front end in spite of continued counterclockwise rotation. However, the counter-clockwise rotation is again reinstated shortly after the front end has passed the brush so that when the relationship is such as indicated in FIGURE 4, the brush is again working toward the rear of the car at the point of contact of the bristles thereof with the side of the car. The brush continues to rotate against the car until the car has passed. At that time the brush is again in the center of the path of the next car, whereupon the cycle ran repeat.

Figure 5:
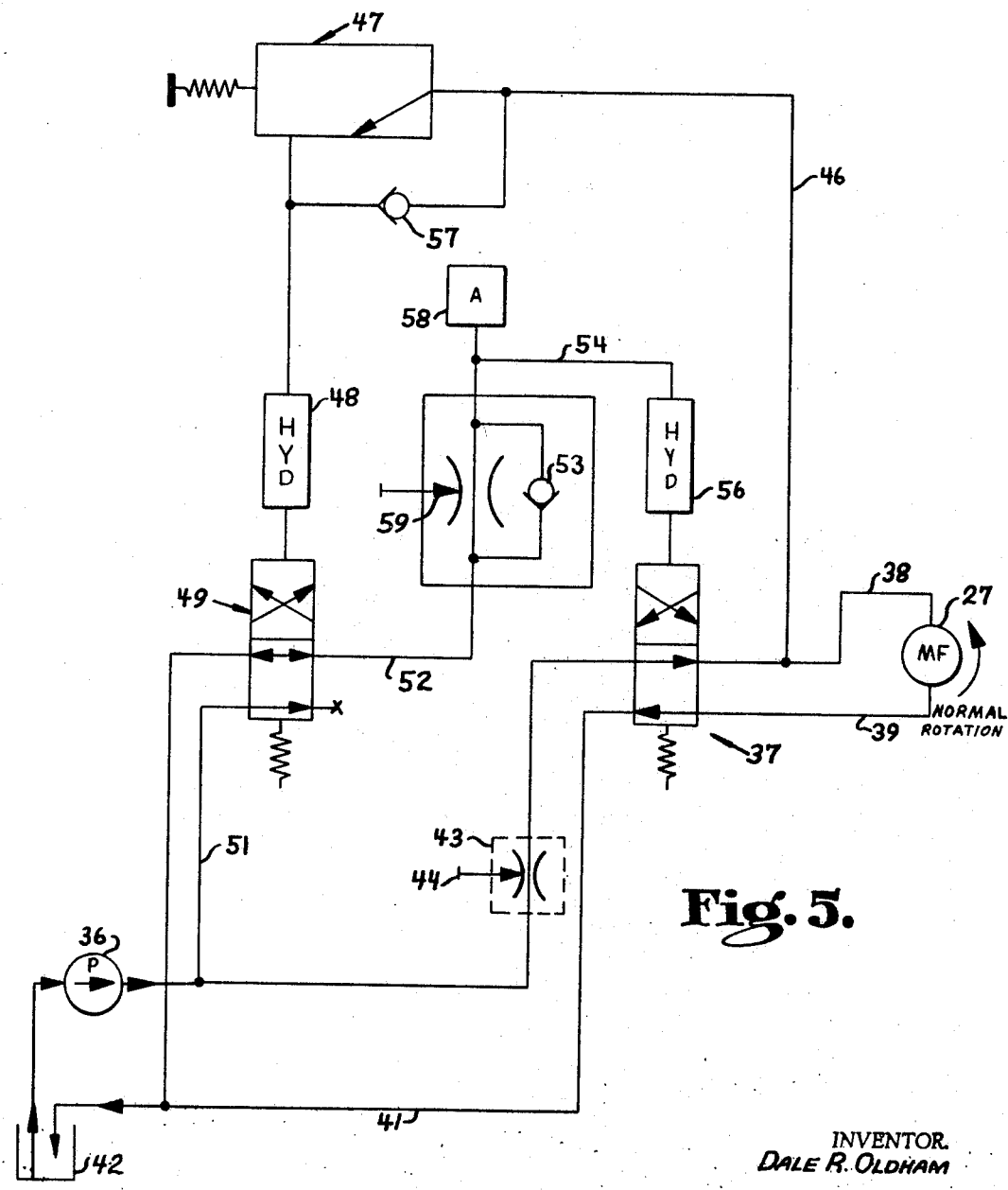
FIG. 5 is a schematic hydraulic diagram of a sensing and control system according to a typical embodiment.

The attainment of this action is implemented in one preferred embodiment by the system of FIGURE 5 wherein a series of valves serve as switches in a manner which will now be described. A power source in the form of a hydraulic pump 36 provides hydraulic fluid at a pressure of 1,000 pounds per square inch (p.s.i.) to a first switch in the form of a two-position four-way hydraulic valve 37 and supply line 38 to the hydraulic brush drive motor 27, the hydraulic fluid being returned through line 39 and valve 37 and line 41 to an energy sink which, in this instance, is a hydraulic fluid reservoir 42. The fluid is supplied from the pump through a flow control valve 43 which may be adjustable at 44 to set the flow at 8 gallons per minute, for example. The normal counter-clockwise rotation of the motor 27 and brush 11 is thereby achieved.

In order to sense the increased load as the car moves the brush outwardly, the hydraulic pressure in line 38 is applied through line 46 to a valve 47. When the pressure rise in line 38 in response to increased brush resistance torque has risen to a certain level predeterminable by adjustment of valve 47, the valve shifts to apply pressure in line 46 to the pilot 48 to shift valve 49. Valve 49 thereupon shifts from the position shown in FIG. 5 to its second position whereupon pump pressure from line 51 is applied through valve 49, line 52, check valve 53 and line 54 to pilot 56 to shift the motor directional control valve 37.

Upon the shifting of valve 37 to its second position, pump pressure is applied to brush drive motor through line 39, and line 38 is vented through valve 37 and line 41 to the sump. This reverses the motor so it drives the brush clockwise.

Upon the shifting of valve 37, the pressure drops in line 46, whereupon valve 47 is returned by its spring to initial condition. Also the pressure in pilot 48 is relieved through check valve 57 to line 46, whereupon the return spring returns valve 49 to initial position. This stops flow in line 51 and permits pilot pressure in line 54 and accumulator 58 to begin to bleed back through restriction 59, line 52, and valve 49 to sump. When pilot pressure has dropped sufficiently, the return spring returns valve 37 to its original position. This reinstates the original direction of flow to the brush motor 27, thus reversing the motor 27 and reinstating counter-clockwise brush rotation.

The load sensing actuator valve 47 can be set to respond to whatever hydraulic pressure rise limit is desired before shifting and starting the valve sequence. A pressure rise of 200 to 300 p.s.i. is an example. The configuration of the front ends of some cars will be such as to cause very little pressure rise because of comparatively low resistance to counter-clockwise brush rotation and, in that event, brush reversal will not be needed and will not occur.

The accumulator, which may have a 100 p.s.i. precharge of air or nitrogen, for example, provides an extra volume on the order of three cubic inches of hydraulic fluid, maintaining the reversed (clockwise) brush rotation for several seconds, and the restriction 59 can be adjusted to adjust the time. Usually about two seconds, for three or four clockwise brush revolutions, is adequate for the brush to move around the front edge of the front fender.

Figure 6:
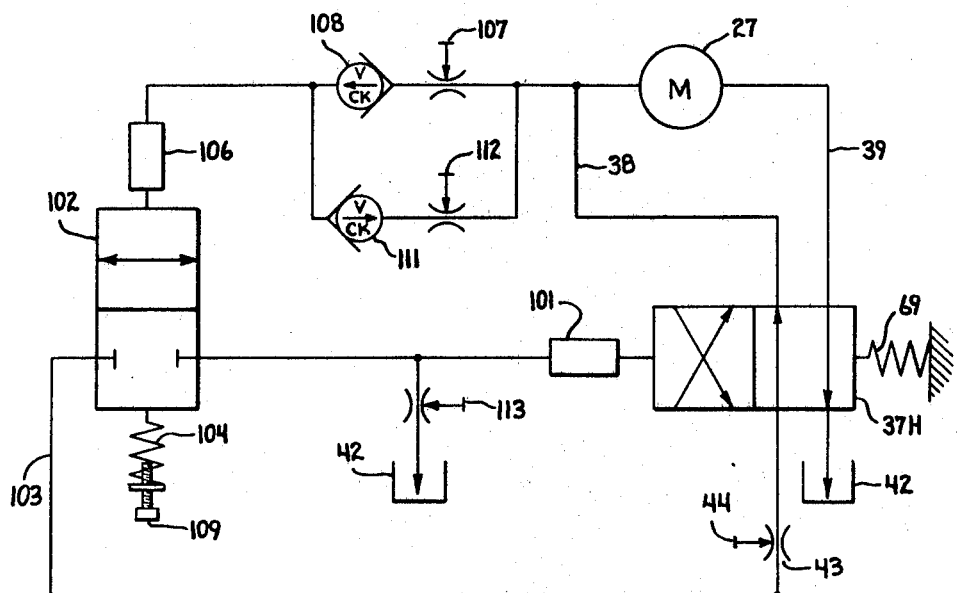
FIG. 6 is a schematic hydraulic diagram of a further embodiment of sensing and control system.

In the embodiment of FIGURE 6 also, hydraulic pressure is used for the valve piloting. In this example, a valve 37H is shown schematically in place of valve 37 of FIGURE 5 and achieves the same purpose of reversing flow to the brush drive motor. In this instance, however, it is operated by hydraulic pilot 101 when the valve 102 is shifted from the position shown to connect the pilot pressure line 103 to the pilot 101. The shifting of valve 102 against the bias of return spring 104 is accomplished by the valve pilot 106 when the pressure applied thereto from the high pressure line 38 of the motor through the flow control valve 107 and check valve 108 reaches a certain level which is determinable by the adjustment 109 on the valve return spring. After reversal of the motor, the pressure in pilot 106 can drop to the motor downstream pressure through the check valve 111 and adjustable flow control valve 112. Pressure in pilot 101 can thereupon drop through the adjustable flow control valve 113 returned to sump 42 and permit return spring 69 to reinstate the normal rotational direction of the motor and brush.

Figure 7:
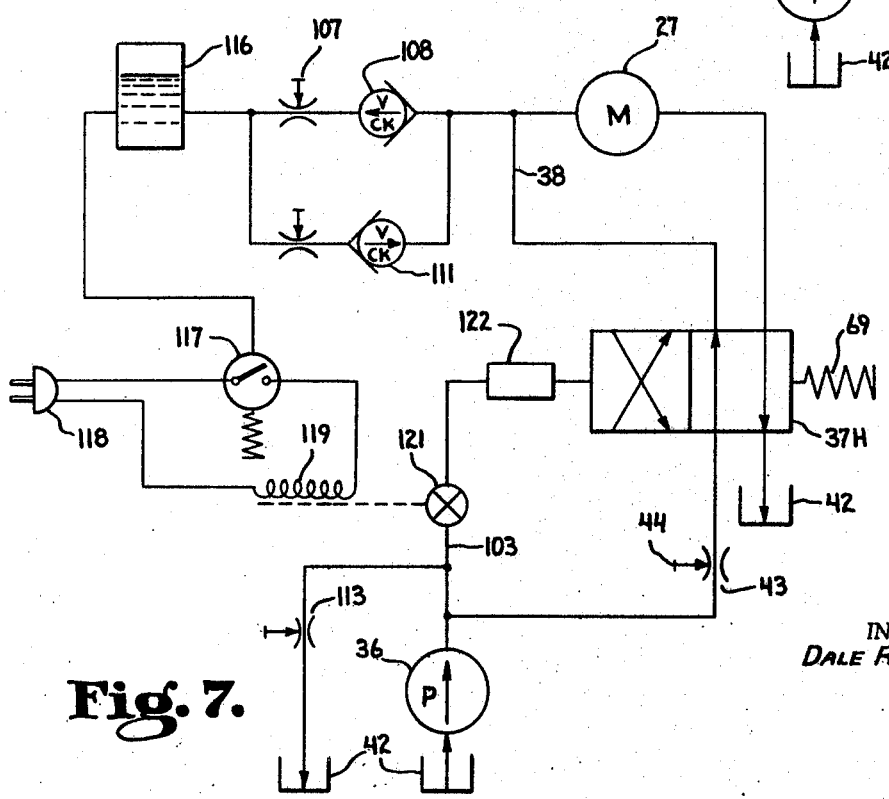
FIG. 7 is a hydraulic and electrical schematic diagram of a still further embodiment of the sensing and control system.

The arrangement in FIGURE 7 is similar to that in FIGURE 6 but an accumulator 116 is provided and the pressure sensing is by means of an electric switch 117 hydraulically closed by the pressure in line 38 applied through the valve 108, adjustable orifice 107 and accumulator 116. This supplies electrical energy from the supply line at plug 118 to a solenoid 119 to open the solenoid operated valve 121 to the pilot 122 whereupon the hydraulic pilot pressure from line 103 shifts the valve 37H against the return spring 69 to reverse the motor.

Figure 8:
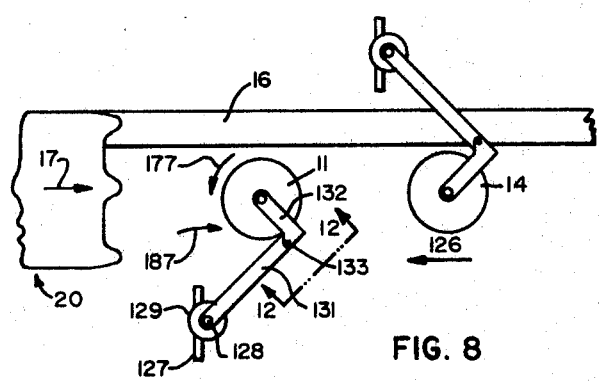
FIG. 8 is a schematic top plan view similar to FIG. 1 but illustrating a different brush layout with a modified brush arm construction for a "breakaway" feature.

Referring now to FIGURE 8, only the right front and left front brushes and arms therefor are shown, to simplify the illustration. In this example, the right front brush arm assembly 126 is pivotally mounted to an upstanding stationary post 127, for example, for rotation about a vertical axis 128. In this example, an actuator 129 urging the arm assembly, and therefore the brush 11 toward the center of the path of the car 20 is of the rotary type having its rotary axis colinear with the pivotal axis of the arm assembly. The left front brush, its arm assembly, and actuator are of the same nature.

Figure 13:
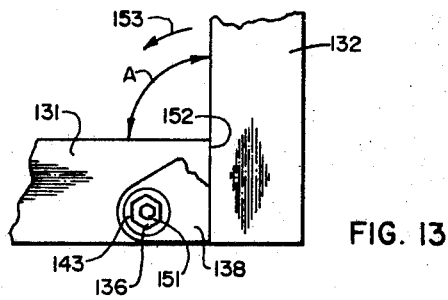
FIG. 13 is a fragmentary top plan view taken at line 13—13 in FIGURE 12.

Comparison of FIGURE 8 with FIGURE 1 reveals that the brush arm assemblies have a slightly different configuration. The included angle of FIGURE 1 is slightly obtuse, whereas it is a right angle in FIGURE 8. This distinction is not mandatory but facilitates the description of this embodiment of the invention wherein the arm assembly actually includes two arms 131 and 132 connected together pivotally about a vertical axis 133 parallel to the axis 128. Details of this connection can be better understood by referring to FIGURES 12 through 14.

Figure 12:
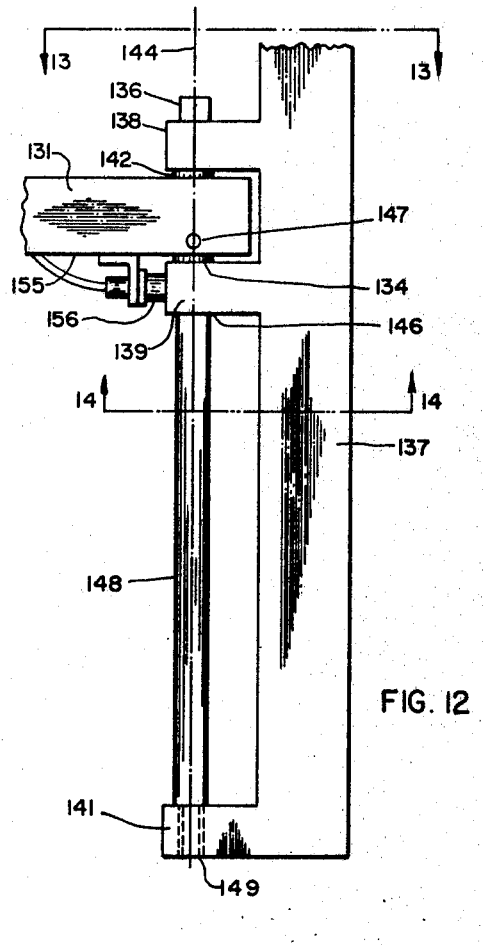
FIG. 12 is an enlarged fragmentary elevational view showing details of the breakaway arm assembly as seen when viewed in the direction of arrows 12—12 in FIGURE 8.

Referring to FIGURE 12, the inner arm 131, which is typically of box-shaped cross section, receives a generally cylindrical sleeve 134 having a hexagonal tool receiving surface 136 at its upper end and extending down through the arm 131 and projecting from the underside thereof. The outer arm 132 includes an upstanding portion 137 having horizontal projections 138, 139, and 141. A bushing 142 is secured in the inner arm and supports the weight of the brush 11 and outer arm 132 on the upper face thereof, and also serves as the upper support for the torsion bar sleeve 134 in the inner arm. The upper projection or bracket 138 has a bushing 143 therein and secured thereto and which pilots on the torsion bar sleeve, facilitating rotation of the arm 132 with respect to arm 131 about the vertical axis 144. Projection 139 has a bushing 146 therein piloting on the torsion bar sleeve also facilitating rotation on the axis 144. The rotational position of the torsion bar sleeve in the arm 131 is fixed by a set screw 147. The torsion bar 148 has a hexagonal lower end fittingly received at 149 in the lower projection 141 to prevent relative rotation therein. The torsion bar has a hexagonal upper end 151 fittingly received in a matching hex in the upper end of the torsion bar sleeve, preventing relative rotation between these two parts at the upper end.

The outer arm post portion 137 is also of rectangular box-shaped cross section and because of the offset location of the pivotal axis 144 and the flat abutment surface 152 of the inner arm 131, the surface 152 provides a stop engageable by the outer arm post portion 137 to limit relative rotation between the two in the direction of the arrow 153 at a point where the two are at 90 degrees with respect to each other. However, the angle A between the two arms can increase to a great extent, and such action is resisted only by the restoring force established in the torsion bar 148. The amount of this force can be increased when the arms are in the 90 degree relationship shown in FIGURE 13, by turning the upper end of the torsion bar in the direction of arrow 153. This is accomplished by loosening the set screw 147, placing a tool on the tool receiving upper end of the torsion bar sleeve and rotating the sleeve in the direction of arrow 153 in the inner arm 131. When the desired force has been developed in the torsion bar 148, the set screw 147 is again tightened. In this way, the force required to move the arms out of the 90 degree relationship and thereby cause "breakaway" of the arm 132 with respect to arm 131 can be established as high as desired.

An air switch 156 is secured to the lower face 155 of the inner arm 131 and has an operating plunger 157 with a cam follower roller 158 thereon engaging the surface 159 of the outer arm projection 139. The air lines 161 and 162 associated with the switch are received into the box-shaped arm through an aperture 163 in the lower face thereof.

Figure 15:
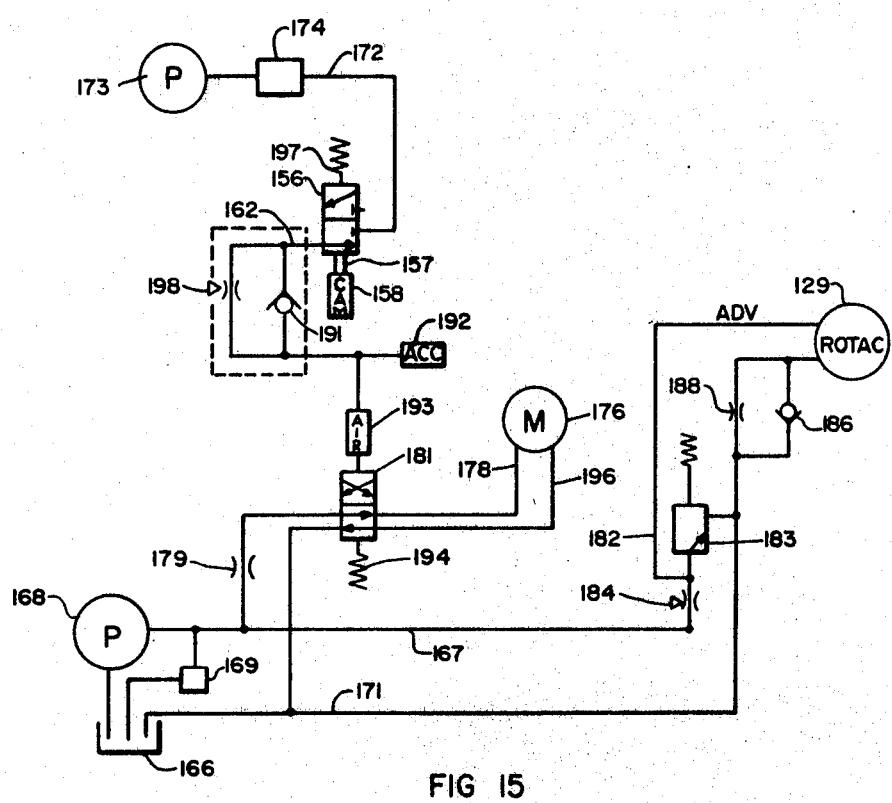
FIG. 15 is a schematic pneumatic and hydraulic diagram for the embodiment of FIGURES 8 through 14.

Referring now to FIGURE 15, hydraulic fluid from reservoir 166 is provided under pressure at line 167 by the pump 168 having a suitable pressure regulator 169 associated therewith. The return line is at 171. Air pressure is provided at line 172 by the pump 173 and suitable accessories 174 such as the filter, lubricator, and pressure regulator.

Hydraulic motor 176 is provided to drive brush 11 and normally drives the brush in the direction of arrow 177 (FIGURE 8) when hydraulic fluid is supplied thereto on line 178. This normally occurs from line 167 through the Hydraulic motor 176 is provided to drive brush 11 and normally drives the brush in the direction of arrow 177 pressure compensated flow controller 179 and the pilot-operated spring-return directional valve 181.

The rotary actuator 129 is hydraulically operated and an example thereof is the "Rotac" marketed by Ex-Cell-O Corp., of Greenville, Ohio. A hydraulic supply on the "advance" line 182 thereto is provided at a pressure determined by the pressure-operated spring-return relief valve 183, the volume of fluid used to accomplish this pressure control being determined by the adjustable restriction 184. The pressure is set to cause the actuator to urge the arm assembly and therefore the brush toward the center of the path of the car with a force sufficient to provide the desired brush "crush" against the front and side surfaces of the car as it is moved along the conveyor. A check valve is provided at 186 to enable rapid pivoting of the arm assembly in the direction of arrow 187 (FIGURE 8) by contact of the brush with the car if and when necessary. Restriction 188 controls the rate of advance of the brush out toward the center of the path under the urging of the rotary actuator after the car has passed.

OPERATION

Figure 9:
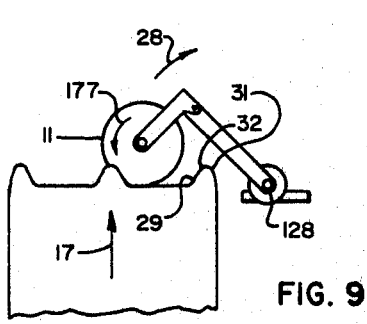
FIG. 9 is a view similar to FIG. 2 and showing the right front brush of FIG. 8 a few moments after it has been contacted and moved a bit by the front end of the advancing vehicle.
Figure 10:
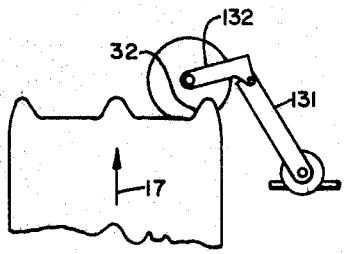
FIG. 10 is a view similar to FIG. 9 at a further stage of advance of the vehicle, just after "breakaway" of the brush arm occurs.
Figure 11:
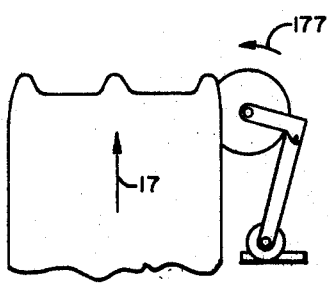
FIG. 11 is similar to FIG. 10 at a further stage of advance of the vehicle when the brush arm assembly has returned to normal configuration.

Referring now to FIGURE 8, as the car approaches the brush 11, the rotary actuator holds the brush near the center of the path of the car. The drive motor rotates the brush in the direction of arrow 177. When the car engages the brush, it begins to move the brush and arm assembly outward about axis 128 in the direction of arrow 28, as shown in FIGURE 9. Brush rotation continues in the direction of arrow 177. As the car continues to move along, the brush moves across the front thereof toward the pocket 29 and soon the bristles are engaging the surface 32 facing the center of the path of the car and interrupting the smooth outward rotation of the brush and arm assembly as the brush rotation itself tends to urge the brush toward the center of the path of the car. The continued movement of the car caused by the conveyor increases the load on the brush and on the arm assembly until, at some load level determined by the biasing force established in the torsion bar, the outer arm 132 will break away from its initial position with respect to arm 131. This is shown in FIGURE 10.

Figure 14:
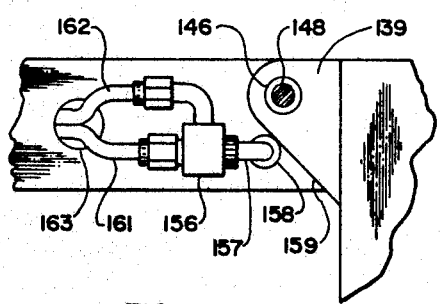
FIG. 14 is a fragmentary bottom plan view taken at line 14—14 in FIGURE 12.

As soon as the breakaway occurs, the air switch plunger 157 extends, as will be apparent upon reference to FIGURE 14. Reference to FIGURE 15 reveals that when this happens, the air switch shifts to connect air supply line 172 through the check valve 191 to accumulator 192. Upon sufficient rise of pressure in the accumulator 192, which is a matter of a few seconds, the air pressure in valve pilot 193 will rise sufficiently to shift the valve 181 against the bias of return spring 194 to reverse the direction of hydraulic supply to brush motor 176. In this event, the high pressure line is connected to line 196 of the motor and the motor reverses, with the consequent reversal of the front brush. The rotation thereof is then in the clockwise direction as viewed from above to aid the travel of the brush around the front end 31 of the fender.

When the load on the brush and the arm assembly has thus decreased, the torsion bar 148 will again return the second arm to its initial position with respect to the inner arm 131 whereupon the air switch return spring 197 will return the switch to its initial condition. This removes the air supply from the pilot 193 and when the pressure has sufficiently dropped as determined by the setting of the restriction 198, the valve return spring 194 will reinstate the normal direction of hydraulic supply to the front brush motor and reinstate the normal counter-clockwise direction of brush rotation. The accumulator 192, together with the adjustable restriction 198, serves to keep the brush in the reverse operation condition sufficiently long that there will not be a problem of intermittent and sporadic switching in the event of brush balance.

From the foregoing description, it will be apparent that although brush reversal is the preferred effect to be achieved when the initial relationship of the brush arms is disturbed, it is possible that there might be instances where a brush speed change or some other effect would be used instead of complete reversal. Also it should be apparent that while the brush arm assembly is pivotally mounted on a vertical axis and while the two brush arms are mounted with respect to each other also on a vertical axis, mountings other than strictly pivotal mountings are within the scope of the invention. Where pivotal mountings are used, it seems preferable that they be vertical, or at least generally upstanding axes. However, there might be instances where the present invention would be applied to brushes and mountings incorporating horizontal axes.

It is recognized that combinations of electrical, hydraulic, and pneumatic devices can be employed to practice the invention. Accordingly, switches can be employed in a variety of forms including pneumatic and hydraulic valves and electrical contactors. Similarly, in addition to reversible electric and hydraulic and pneumatic motors for brush drive, unidirectional motors with electrically, pneumatically, or hydraulically reversible and controllable transmissions and clutches may also be employed.

The invention claimed is:

1. The combination comprising:
    a mount;
    brush support arm means movably connected to said mount;
    a brush mounted for rotation on said arm means;
    a motor driving said brush in rotation;
    and means responsive to a predetermined character of operation of said arm means to affect the rotation of said brush;
    said arm means including a first arm connected to said mount, and a second arm connected to said first arm and movable between first and second positions relative to said first arm;
    said second arm being normally biased to said first position;
    and said responsive means including a sensor disposed to sense the position of said second arm relative to said first arm, to affect brush rotation in response to movement of said second arm away from said first position.

2. The combination of claim 1 wherein said responsive means includes motor reversing means coupled to said sensor and to said motor to affect brush rotation by reversal thereof.

3. The combination of claim 2 wherein said responsive means further includes:
    an air switch coupled to said sensor;
    a directional valve coupled to a source of fluid pressure and to said motor and normally supplying fluid in one direction to said motor for brush rotation in one rotational direction;
    said valve having an operating pilot coupled to said air switch, and operable upon actuation of said air switch by said sensor to reverse the direction of fluid supply to said motor to reverse said motor and thereby said brush.

4. The combination of claim 3 wherein said air switch is mounted to said first arm, and said sensor includes a cam follower movably mounted to said air switch and engaging said second arm when said second arm is in said first position.

5. The combination of claim 1 wherein:
    said second arm includes first, second, and third vertically spaced projections thereon;
    said first arm has a portion reecived between said first and second projections, with a sleeve fixed in said portion and projecting upwardly and downwardly therefrom;

said first and second projections have bushings therein rotatably received on said sleeve for pivoting of said second arm on said first arm about a generally upstanding axis;

the bias is provided by a torsion bar having one end non-rotatably attached to said sleeve and the other end non-rotatably attached to said third projection.

6. The combination of claim 5 wherein:

the upper end of said torsion bar is attached to said sleeve;

said sleeve has a tool receiver on the upper end thereof accessible from above said first projection; and said arm portion has fastener means fixing said sleeve therein but temporarily releasable to permit desired turning of said sleeve in said arm portion by application of torsional effort to the tool receiver thereof for establishment of the desired bias in said torsion bar.

7. The combination of claim 1 and further comprising: actuator means connected to said mount and to said arm means and urging said arm means toward a position locating said brush near the center of the path of a vehicle to be brushed;

said brush being movable toward the side of said path by a vehicle moving along said path.

8. The combination of claim 7 wherein:

said first arm is pivotable on said mount;

said first and second arms form the general shape of an L in plan view, the second arm being pivotal on said first arm against the biasing force when pivoting of said first arm on said mount is sufficiently resisted by engagement of said brush with an interrupting surface of the vehicle.

References Cited

UNITED STATES PATENTS 3,187,359    6/1965    Takeuchi.
3,300,803    1/1967    Seakan.

EDWARD L. ROBERTS, Primary Examiner

PO-1050
(5/69)

UNITED STATES PATENT OFFICE
CERTIFICATE OF CORRECTION

Patent No. 3,497,894      Dated March 3, 1970

Inventor(s) Dale R. Oldham

It is certified that error appears in the above-identified patent and that said Letters Patent are hereby corrected as shown below:

Column 7, lines 2 and 3 delete --Hydraulic motor 176 is provided to drive brush 11 and normally drives the brush in the direction of arrow 177.--

Column 8, line 50, --wherein said-- should be "wherein: sai

Column 8, line 66, --wherein said-- should be "wherein: sai

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents